United States Patent [19]

Mok

[11] Patent Number: 5,197,101
[45] Date of Patent: Mar. 23, 1993

[54] DATA COMPRESSION CIRCUIT OF A DIGITAL AUDIO TAPE RECORDER

[75] Inventor: Cheolwoong Mok, Suweon, Rep. of Korea

[73] Assignee: Samsung Electronics Co., Ltd., Suwon, Rep. of Korea

[21] Appl. No.: 749,439

[22] Filed: Aug. 23, 1991

[30] Foreign Application Priority Data

Aug. 24, 1990 [KR] Rep. of Korea .................... 90-13298

[51] Int. Cl.⁵ .......................... G10L 3/02; G11B 5/00; H03M 7/00
[52] U.S. Cl. ....................................... 381/29; 381/30; 381/34; 360/8; 360/32; 341/50; 341/95
[58] Field of Search .................................. 381/29-33, 381/34-40; 360/8, 32; 341/50, 60, 95, 75

[56] References Cited

U.S. PATENT DOCUMENTS

| | | | | |
|---|---|---|---|---|
| 4,758,899 | 7/1988 | Tsukiyama | ............................. | 360/8 |
| 4,802,222 | 1/1989 | Weaver | ................................. | 381/35 |
| 4,862,292 | 8/1989 | Enari | ..................................... | 360/8 |
| 5,047,768 | 9/1991 | Yamaguchi | ........................... | 341/75 |

FOREIGN PATENT DOCUMENTS

8920148 12/1989 Rep. of Korea .

*Primary Examiner*—Dale M. Shaw
*Assistant Examiner*—Kee M. Tung
*Attorney, Agent, or Firm*—Robert E. Bushnell

[57] ABSTRACT

A data compression circuit is provided for a digital audio tape recorder for converting an analog audio signal of standard 16 bit data to compressed 12 bit data when the recorder is in four-channel or long play operation mode. The compression circuit can compress standard data to be recorded with a sampling frequency of 48 KHz and a quantization of 16 bits in long play mode resulting in a compressed data recording in which sampling frequency is 32 KHz and the quantization is 12 bits. Thus, recording the compressed data occurs about twice as fast as recording standard data. Moreover, since the overall amount of recorded data is reduced owing to 12-bit linear compression, channel expansion on the tape is provided.

12 Claims, 4 Drawing Sheets

| GROUP | 16 Bits | | 12 Bits |
|---|---|---|---|
| 1 | 0111 1111 1111 1111 (7FFF)<br>0100 0000 0000 0000 (4000) | 6 bits-shift | 0111 1111 1111 (7FF)<br>0111 0000 0000 (700) |
| 2 | 0011 1111 1111 1111 (3FFF)<br>0010 0000 0000 0000 (2000) | 5 bits-shift | 0110 1111 1111 (6FF)<br>0110 0000 0000 (600) |
| 3 | 0001 1111 1111 1111 (1FFF)<br>0001 0000 0000 0000 (1000) | 4 bits-shift | 0101 1111 1111 (5FF)<br>0101 0000 0000 (500) |
| 4 | 0000 1111 1111 1111 (0FFF)<br>0000 1000 0000 0000 (0800) | 3 bits-shift | 0100 1111 1111 (4FF)<br>0100 0000 0000 (400) |
| 5 | 0000 0111 1111 1111 (07FF)<br>0000 0100 0000 0000 (0400) | 2 bits-shift | 0011 1111 1111 (3FF)<br>0011 0000 0000 (300) |
| 6 | 0000 0011 1111 1111 (03FF)<br>0000 0010 0000 0000 (0200) | 1 bits-shift | 0010 1111 1111 (2FF)<br>0010 0000 0000 (200) |
| 7 | 0000 0001 1111 1111 (01FF)<br>0000 0000 0000 0000 (0000) | non-shift | 0001 1111 1111 (1FF)<br>0000 0000 0000 (000) |
| 7' | 1111 1111 1111 1111 (FFFF)<br>1111 1110 0000 0000 (FE00) | non-shift | 1111 1111 1111 (FFF)<br>1110 0000 0000 (E00) |
| 6' | 1111 1101 1111 1111 (FDFF)<br>1111 1100 0000 0000 (FC00) | 1 bits-shift | 1101 1111 1111 (DFF)<br>1101 0000 0000 (D00) |
| 5' | 1111 1011 1111 1111 (FBFF)<br>1111 1000 0000 0000 (F800) | 2 bits-shift | 1100 1111 1111 (CFF)<br>1100 0000 0000 (C00) |
| 4' | 1111 0111 1111 1111 (F7FF)<br>1111 0000 0000 0000 (F000) | 3 bits-shift | 1011 1111 1111 (BFF)<br>1011 0000 0000 (B00) |
| 3' | 1110 1111 1111 1111 (EFFF)<br>1110 0000 0000 0000 (E000) | 4 bits-shift | 1010 1111 1111 (AFF)<br>1010 0000 0000 (A00) |
| 2' | 1101 1111 1111 1111 (DFFF)<br>1100 0000 0000 0000 (C000) | 5 bits-shift | 1001 1111 1111 (9FF)<br>1001 0000 0000 (900) |
| 1' | 1011 1111 1111 1111 (BFFF)<br>1000 0000 0000 0000 (8000) | 6 bits-shift | 1000 1111 1111 (8FF)<br>1000 0000 0000 (800) |

FIG. 4

| 16 Bits | | 12 Bits |
|---|---|---|
| 01wxyzabcdefghij | (6 bits shift) | 0111wxyzabcd |
| 001wxyzabcdefghi | (5 bits shift) | 0110wxyzabcd |
| 0001wxyzabcdefgh | (4 bits shift) | 0101wxyzabcd |
| 00001wxyzabcdefg | (3 bits shift) | 0100wxyzabcd |
| 000001wxyzabcdef | (2 bits shift) | 0011wxyzabcd |
| 0000001wxyzabcde | (1 bits shift) | 0010wxyzabcd |
| 00000001wxyzabcd | (nonshift group) | 0001wxyzabcd |
| | | |
| 1111110wxyzabcd | (nonshift group) | 1110wxyzabcd |
| 111110wxyzabcde | 1 bits shift | 1101wxyzabcd |
| 11110wxyzabcdef | 2 bits shift | 1100wxyzabcd |
| 1110wxyzabcdefg | 3 bits shift | 1011wxyzabcd |
| 110wxyzabcdefgh | 4 bits shift | 1010wxyzabcd |
| 10wxyzabcdefghi | 5 bits shift | 1001wxyzabcd |
| 10wxyzabcdefghij | 6 bits shift | 1000wxyzabcd |

5,197,101

DATA COMPRESSION CIRCUIT OF A DIGITAL AUDIO TAPE RECORDER

FIELD OF THE INVENTION

The present invention relates to the improvement of a data compression circuit of a digital audio tape recorder and, more particularly, to a data compression circuit for converting an analog audio signal of standard 16 bit data into compressed 12 bit data when a digital audio tape recorder is in either a four-channel or in a long play operation mode.

BACKGROUND OF THE INVENTION

Generally, in a record/play selection of a digital audio tape recorder, there are six operational modes including four-channel, long play and the like. An analog audio signal received in either a four-channel operational mode or in long play operational mode is used for a digital in which a sampling frequency is 32 KHz, a quantization is 12 bits, and information quality of each channel is 768K bit/sec (2×32 KHz×12 bits=768K bit/sec). A long play mode is provided for recording data for relatively long periods. Standard data is provided with a sampling frequency of 48 KHz, a quantization is 16 bits, and information quantity for each channel equals 768K bit/sec (48 KHz× 16 bits=768K bit/sec). Accordingly, to achieve long recording in a digital audio tape recorder, a data compression circuit is required for compressing standard data into compressed digital data.

A data compression circuit for converting 16-bit standard data to 12-bit compressed data is disclosed in Korean Patent Application NO. 89-20148. Conventional data compression circuits are inaccurate in compressing 16-bit standard data to 12-bit compressed data. Thus, the present invention provides an improved data compression circuit, resulting in more accurate compression of data.

SUMMARY OF THE INVENTION

It is an object of the present invention to provide a data compression circuit for a digital audio tape recorder which more accurately compresses and records 16-bit standard data as 12-bit compressed data on an audio tape when the operational mode of a digital audio tape recorder is in either a four-channel or in a long play operational mode. In the long play operational mode, the data compression circuit records compressed data about twice as fast as standard data is recorded. Also, 12-bit linear compressed data allows space for expansion of channels on the tape.

The present invention overcomes the above problems in the prior art by providing a data compression circuit for a digital audio tape recorder enabling conversion of an analog audio signal of standard data into compressed data when the tape recorder is in four-channel or long play operation mode. The data compression circuit comprises: a system controller control means having a timing pulse generator; a converter receiving the analog audio signal and sequentially producing sixteen bits of digital data; a first shift register for serially loading the data produced by the converting means synchronously with an external clock from the control means and simultaneously outputting the data in parallel; a second shift register receiving and storing in parallel the digital data input from the first shift register by using a load control signal from a load terminal of the control means and outputting in parallel the stored data; a first flip-flop latching eight high-order bits of the stored data synchronously with the load control signal; an absolute value producer receiving the stored eight high-order bits of the first flip-flop and outputting an absolute value, the absolute value producer including a plurality of exclusive OR gates for inputting each of the eight high-order bits from the first flip-flop and a most significant bit thereof; a magnitude comparator comparing the absolute value received from the absolute value producing means with a reference value; a first exclusive OR gate receiving a most significant bit of the output data from the first shift register and the most significant bit of the eight high-order bits received from the first flip-flop; a shift clock producing a clock pulse for shifting the data input to the second shift register, the shift clock comprises a second flip-flop for loading a high level signal synchronously with an output of the first exclusive OR gate and being reset by a reset signal of the control means, a first AND gate receiving an output signal of the second flip-flop and an inverted clock signal of the control means, and a first OR gate receiving an output signal of the first AND gate and a control signal of the control means; a three-bit binary counter providing data by counting up and down in accordance with a clear signal from the control means and the clock signal, from the control means; a first multiplexer selectively outputting one of the up-counted and down-counted data of the binary counter in accordance with the most significant bit of the output data of the first flip-flop; a latching clock generator producing a clock signal to latch the output data of the first multiplexer, the generator comprising a first NAND gate receiving two control signals from the control means and the output signal of the first exclusive OR gate, a third flip-flop reset by a control signal from the control means loading a high level signal synchronously with an output of the first NAND gate, a NOR gate receiving the output signal of the first NAND gate and an output signal of the third flip-flop, and a second NAND gate receiving an output of the NOR gate and a control signal from the control means; a fourth flip-flop latching the output data of the first multiplexer synchronously with an output signal of the binary counter; a second multiplexer selectively multiplexing and outputting data received from the fourth flip-flop and three low-order bits of the output data of the first flip-flop, in accordance with an output from the magnitude comparator; a third shift register receiving in parallel eight bits received from the second shift register, the most significant bit of the output data of the first flip-flop and three bits output from the second multiplexer; and a fifth flip-flop latching a serial output from the third shift register synchronously with the inverted external clock.

BRIEF DESCRIPTION OF THE DRAWINGS

This invention will be better understood and its numerous objects and advantages will become apparent to those skilled in the art by reference to the accompanying drawings as follows:

FIG. 3 is a table diagram explaining the principle for converting 16-bit data to 12-bit data according to the data compression circuit.

DETAIL DESCRIPTION OF THE PREFERRED EMBODIMENT

Figure 1:
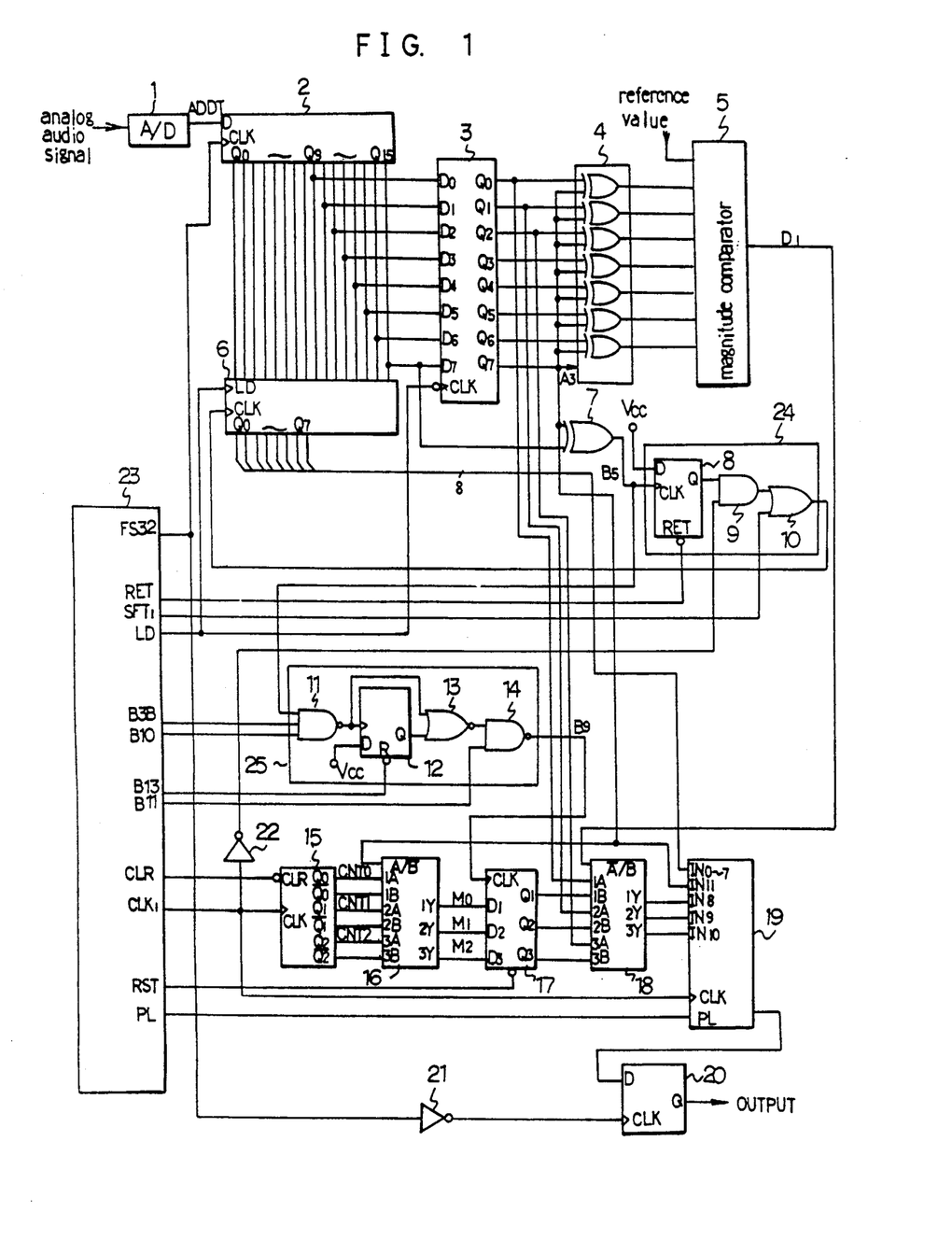
FIG. 1 is a circuit diagram of a preferred embodiment of a data compression circuit according to the present invention.
Figure 2:
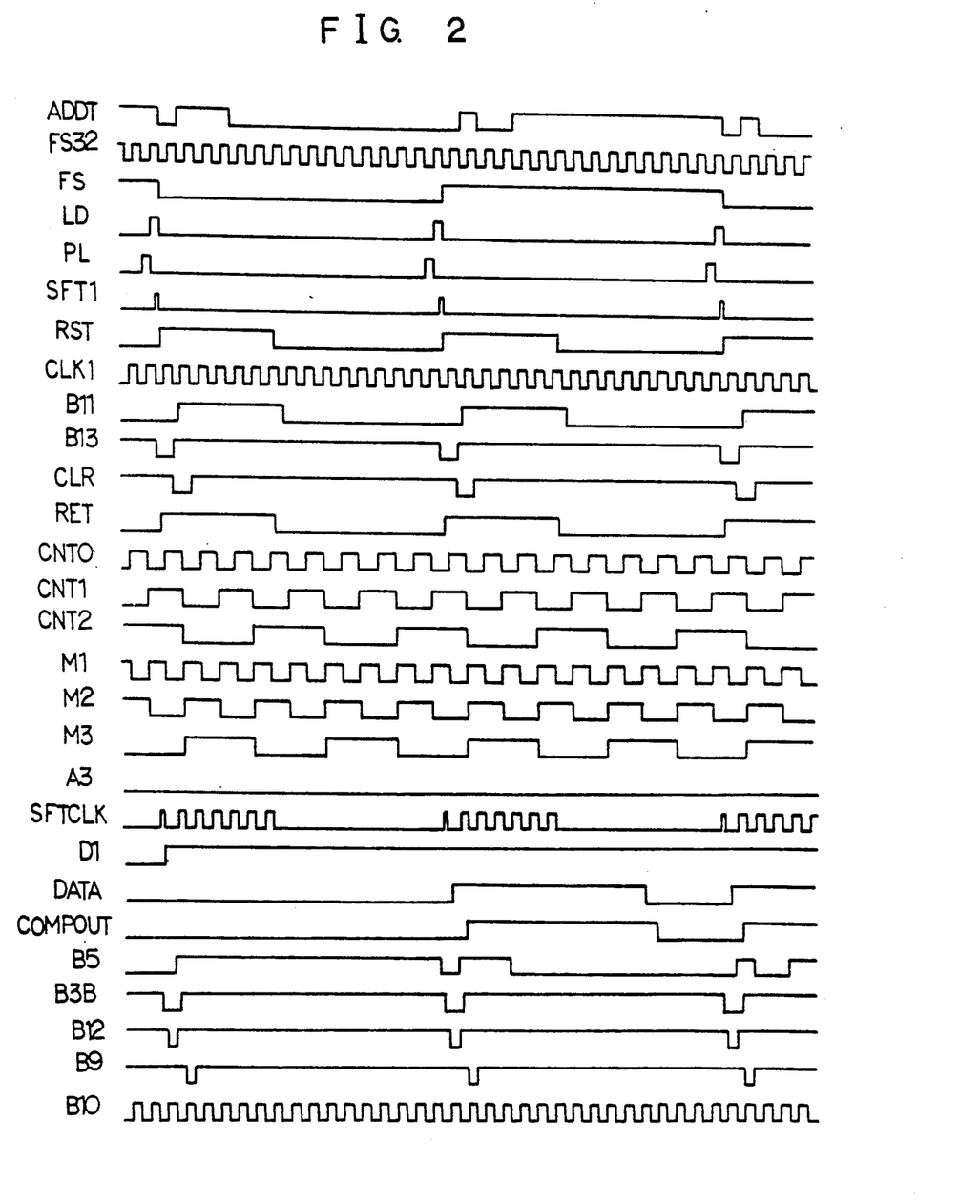
FIG. 2 is a waveform timing diagram of waveforms from the operation of the data compression circuit.

Turning now to the drawings, FIG. 1 is a circuit diagram of a preferred embodiment of a data compression circuit according to the present invention and FIG. 2 is a waveform diagram showing the timing of the respective waveforms for explaining the operation of the data compression circuit of FIG. 1. Referring to FIG. 1, the input signal of the circuit is an analog audio signal applied to a converter 1 so as to convert the analog audio signal into digital data by using a linear quantization process. The output digital data of the converter 1 includes 16-bit information and is applied sequentially to the input terminal D of a serial-in parallel-out shift register 2 synchronously with a clock signal FS32 from system controller 23, and so the digital data serially inputted into shift register 2 is shifted and output in parallel. The system controller 23 includes a timing pulse generator (not shown). The output digital data of the converter 1 is indicated as waveform ADDT in FIGS. 1 and 2 and the clock signal (control signal 1) is indicated as waveform FS32, with a frequency which is thirty-two times that of a sampling clock FS.

The output 16-bit data ($Q_0$–$Q_{15}$) of shift register 2 is loaded simultaneously in a parallel-in parallel-out shift register 6 in response to a load signal (control signal 4) applied from a load terminal LD of system controller 23 when one data sample converted by converter 1 is stored in register 2, and simultaneously an eight high-order bit data output from shift register 2 is applied to input terminals D0–D7 of a first D flip-flop 3 as controlled and latched by inverted load signal LD. The input data of the D type flip-flop 3 is output through the output terminals Q0–Q7 thereof at the falling edge of the load signal LD, and is applied to an absolute value producer 4 having seven exclusive OR gates.

The most significant bit of output terminal Q7 of absolute value producing means 4 is applied to one input terminal of each of the seven exclusive OR gates and the seven bits from the output terminals Q0 to Q6 are applied to the other terminal of each of the gates, respectively, so that absolute value producing means 4 outputs an absolute value as positive data. Absolute value producing means 4 provides negative data when the most significant bit of output terminal Q7 is "high". The output data of absolute value producing means 4 is input to a magnitude comparator 5 and compared with a reference value to be set in the Digital Audio Tape recorder. Comparator 5 compares data of Group 7 or 7' i.e. a as shown in FIG. 3. Accordingly, the reference value of comparator 5 is set as the eight high-order bits "0000 0001" or "111 1110" of the data of the Groups 7 and 7', respectively. If the output data of absolute value producing means 4 is greater than the reference value, the comparator 5 outputs a "high" signal and if not, the comparator 5 outputs a "low" signal.

Figure 4:
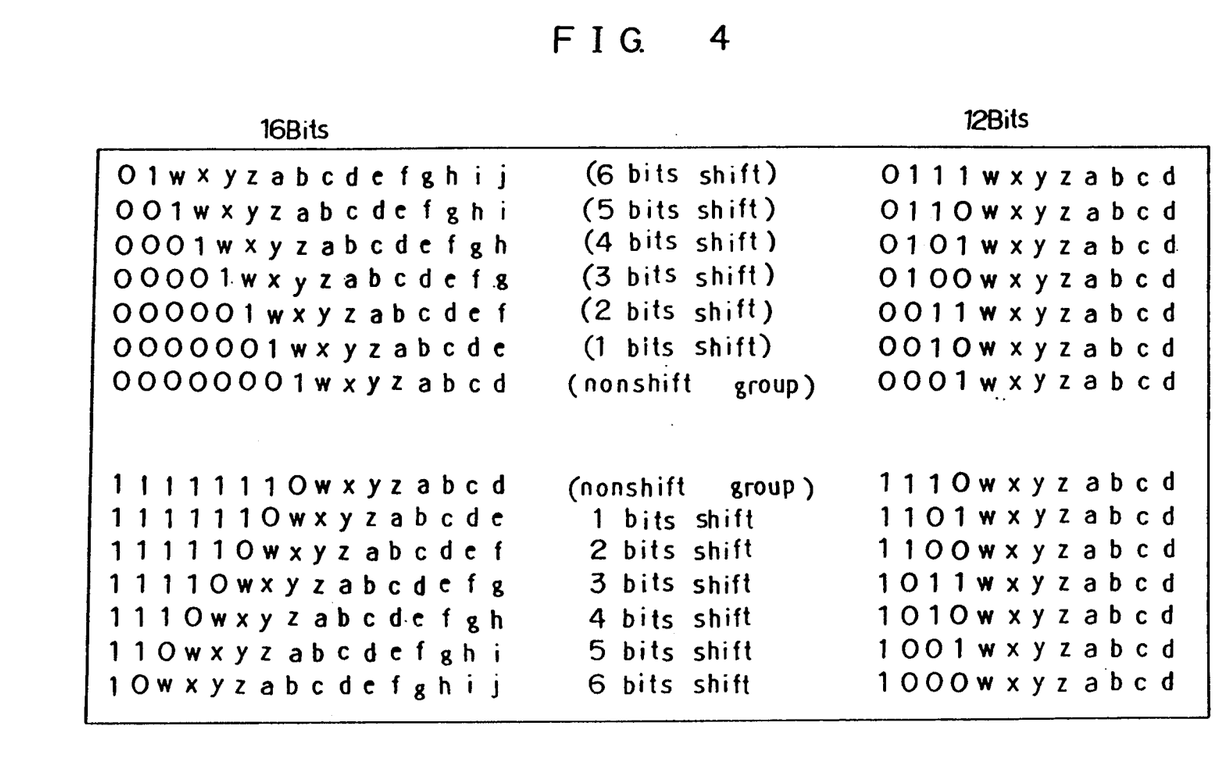
FIG. 4 is another table diagram explaining the principle for converting 16-bit data to 12-bit data according to the data compression circuit.

FIGS. 3 and 4 are table diagrams explaining the principle for converting 16-bit data to 12-bit data according to the invention. The processing operation of data corresponding to Groups 1–7 and Groups 1'–7' will be described in detail with reference to FIGS. 3 and 4. The 16-bit data to be compressed is represented as d0 to d15, whereas d15 (located at the far left of the 16-bit data) is a most significant bit, and 12-bit compressed data is represented as t0–t11, whereas t11 (located at the far left of the 12-bit data) is the most significant bit. Three high-order bits t8 to t10 of the 12-bit compressed data t0–t11 are defined by respective characteristics of Groups 1–7 and Groups 1'–7' in FIG. 3 and eight bits t0–t7 are defined by a number of shifting bits. For example, 6-bit shifted Group 1 in FIG. 4 has 16 bit data "01wxyzabcdefghij" wherein the three high-order bits t10, t9, t8 of the compressed data become 1,1,1 and the eight bits t0–t7 become "wxyzabcd" as a result of 6-bit shifting. On the other hand, 1-bit shifted Group 6 has 16 bit data "0000001wxyzabcde" wherein the three high-order bits t10, t9, t8 become 0, 1, 0, respectively, and the eight bits t0 to t7 become "wxyzabcd" as a result of 1-bit shifting. In the non-shift case of Group 7, no shifting has occurred and the compressed data is "0001wxyzabcd".

In FIG. 3, Groups 1 through 7, the case when a most-significant bit (d15 or "MSB") is "0" will be described. Group 1 is a collection of codes in which the bit closest to d15 which differs with d15 is d14 (MSB-1). Group 2 is a collection of codes in which MSB-2, i.e., d13, is the closest bit different from MSB d15. Group 3 is a collection of codes in which d12 or MSB-3 is the closest bit different from the MSB, etc., for each of Groups 4 through 6. However, Group 7 is a collection of codes in which no shifting of 16-bit linear data occurs.

In FIG. 1, an exclusive OR gate 7 receives a most significant bit (Q7) of an output data from first D flip-flop 3 and a MSB (Q15) of an output data of shift register 2 corresponding to the shifting of the MSB. Exclusive OR gate 7 outputs a weight detecting signal B5, i.e., a signal different from the MSB in the range of the above described sampling code. The weight detecting signal B5 is applied to a clock terminal CLK of a second D flip-flop 8 in a shift clock 24, and the second D flip-flop 8 outputs a "high" signal through the output terminal Q thereof at first falling edge of the weight detecting signal B5, that is, when a signal different from the MSB is first detected. Therefore, flip-flop 8 outputs the "high" signal before receiving the reset signal RET (i.e., control signal 2) from the system controller 23. The clock signal CLK1 (i.e., control signal 10) from system controller 23 is inverted by an inverter 22 then passed through an AND gate 9 while the output signal of flip-flop 8 is "high".

If the weight detecting signal B5 is detected at a MSB-1 bit, only six pulses in CLK1 can be passed through AND gate 9. If the weight detecting signal B5 is detected at a MSB-2 bit, only five pulses in the clock signal can be passed through AND gate 9, and if the weight detecting signal B5 is detected at a MSB-6 bit, only one pulse can be passed through AND gate 9. Moreover, if the weight detecting signal B5 is detected at a MSB-7 bit, no clock signal pulse can be passed through AND gate 9 since flip-flop 8 is reset by signal RET from system controller 23. The output signal of the AND gate 9 and signal SFT1 (control signal 3) from system control means 23, are applied to OR gate 10 which outputs a clock signal SFTCLK for synchronizing shift register 6. The clock signal SFTCLK is designated in FIG. 2. The signal SFT1 acts commonly to each Group in which a rising edge has occurred once, when a load signal LD from the system control means 23 is "high" and is enabled to provide parallel data to be loaded into shift register 6 from shift register 2.

If no shifting has operation occurred as in Group 7, the output signal SFTCLK of the shift clock 24 is the output signal SFT1 of the system control means 23, and no shifting operation in shift register 6 occurs. For shifting as in Group 1, the output signal SFTCLK includes the signal SFT1 from the system control means 23 and six pulses from AND gate 9 which are inverted by inverter 22, thus six shifting operations occur in shift register 6. In other words, the shifting operation of shift register 6 is dependent upon a number of pulses of output signal SFTCLK from the shift clock 24.

Operations for producing three high-order bits t8 to t10 of 12-bit compressed data will now be described. A 3-bit binary counter 15 counts up and down by a clock signal CLK1 from system controller 23 and is cleared by a clear signal CLR (control signal 9) from system controller 23. The output data of the counter 15 is applied to a first multiplexer 16 which is controlled by the MSB (Q7) of the output data of the first D flip-flop 3. When Q7 is "low", multiplexer 16 selects down-count data from the output of counter 15 and outputs the selected down-count data. However, when Q7 of flip-flop 3 is "high", then multiplexer 16 selects up-counted data from the output of counter 15 and outputs the selected up-counted data.

Fourth D type flip-flop 17 latches the selected data output from multiplexer 16 in response to an output clock signal B9 of a latching clock generator 25. The latched data of fourth D flip-flop 17 is applied to a second multiplexer 18, together with three low-order bits of the output data of first D flip-flop 3, and the output signal from the magnitude comparator. To control the latching operation of fourth D flip-flop 17, the latching clock generator 25 comprises: a first NAND gate 11 for receiving two control signals B3B (control signal 5) and B10 (control signal 6) from the system controller 23 and the output signal B5 of exclusive OR gate 7; a third D flip-flop 12 for synchronous loading a high signal with an output of the first NAND gate 11 and being reset by a control signal B13 (controller signal 7) from the system controller 23; a NOR gate 13 for receiving an output signal of the first NAND gate and an output signal of the third D flip-flop 12; and a second NAND gate 14 for receiving the output signal of the NOR gate 13 and a control signal B11 (control signal 8), from system controller 23.

When the MSB from first D flip-flop 3 is "low", the data M0 to M2 selected by the first multiplexer 16 is as follows:

TABLE 1

| Bit position of weight detecting signal different from the MSB | M2 | M1 | M0 |
|---|---|---|---|
| (MSB-1) | 1 | 1 | 1 |
| (MSB-2) | 1 | 1 | 0 |
| (MSB-3) | 1 | 0 | 1 |
| (MSB-4) | 1 | 0 | 0 |
| (MSB-5) | 0 | 1 | 1 |
| (MSB-6) | 0 | 1 | 0 |

Moreover, when the weight detecting signal B5 is detected at the MSB-7 bit, at relatively close bit positions as compared with the MSB-7 bit, the output clock B9 of the latching clock generator 25 is not produced and fourth D flip-flop 17 will continues to hold previous data. The signal B11 (control signal 8), of system controller 23 is applied to one terminal of NAND gate 14 as a window signal for detecting the weight detecting signal B5 which is different from the MSB at the closest location below the MSB-7 bit position.

The data output from output terminals Q1 to Q3 of fourth D flip-flop 17 is three high-order bits t1, t2, t3 of the 12-bit compressed data relating to Groups 1 through 6 and are applied to the second multiplex 18, together with three low-order bits output from first D flip-flop 3.

When the output signal D1 of the comparator 5 is "high", that is, when at least one shifting operation has occurred, the second multiplexer 18 selects and outputs the output data of fourth D flip-flop 17. When the output signal D1 is "low", i.e., no shifting operation has occurred, the multiplexer 18 selects and outputs the three low-order bits, Q0, Q1, and Q2 from first D flip-flop 3.

As described above, the MSB of the output data of first D flip-flop 3 is applied to a parallel-in serial-out third shift register 19 as the MSB t11 of the 12-bit compressed data. The output data of second multiplexer 18 is applied to third shift register 19 as the three high-order bits t10, t9, t8 of the compressed data, and the output data of the second shift register 6 is applied to the third shift register 19 as eight low-order bits of the compressed data.

The 12-bit data input by the third shift register 19 is serially input into a fifth D flip-flop 20 by a control signal PL (control signal 12), produced near an edge of a sampling frequency F2. The flip-flop 20 outputs 12-bit compressed data in response to an inverted control signal 1, i.e., $\overline{F S 3 2}$ inverted by inverter 21.

According to the present invention as described above, when a digital audio tape recorder including a data compression circuit is set to either a four-channel operational mode or a long play operational mode, the data compression circuit compresses recording data from 16 bit data in which a sampling frequency is 48 KHz, and provide a long play recording in which sampling frequency is 32 KHz and the quantization is 12 bits. Therefore, recording 12-bit compressed data occurs nearly twice as fast as recording 16-bit data. Moreover, since the overall amount of recorded data is reduced owing to 12-bit linear compression, channel expansion on the tape is provided.

What is claimed is:

1. A data compression circuit of a digital audio tape recorder for converting analog audio signal of standard mode into compressed data during an operation mode of the tape recorder is four-channel mode or long play mode, the circuit comprising:
   system control means providing a timing pulse;
   converting means for receiving said analog audio signal and sequentially outputting 16 bits of digital data;
   first shift register means for serially loading the digital data from the converting means synchronously with an external clock from a terminal of the control means and outputting in parallel said digital data simultaneously as parallel data;
   second shift register means for loading in parallel said parallel data from the first shift register means in response to a load control signal from a load terminal of the control means and outputting said parallel data in parallel;
   first flip-flop means for latching eight high-order bits of the stored information synchronously with the load control signal;
   means for providing an absolute value based upon the stored eight high-order bits from the first flip-flop means said providing means comprising a plurality of exclusive OR gates for inputting each of the eight high-order bits and a most significant bit of said eight high-order bits;

magnitude comparator means for comprising the absolute value with reference value;

an exclusive OR gate for receiving the most significant bit and the most significant bit of the eight high-order bits applied from the first shift register means;

shift clock producing means for producing clock signals for shifting the input data of the second shift register means, the producing means comprising second flip-flop means for loading a high level signal synchronously with the output of the exclusive OR gate and being reset by a reset signal from the control means, an AND gate for receiving the output signal of the second flip-flop means and the output clock from the control means and an OR gate for receiving the output signal from the AND gate and an output signal from the control means;

three-bit binary counter means for counting up and down by a clear signal and clock signal from the control means;

first multiplexer means for selectively outputting the counted data of the binary counter in accordance with the most significant bit of the output data of the first flip-flop;

latching clock generator means for producing clock to latch the output data of the first multiplexer means, the generator means comprising a first NAND gate for receiving two control signals from the control means and said output signal of the exclusive OR gate, a flip-flop for loading a high level signal synchronously with the output of the first NAND gate and being reset by a control signal of the control means, a NOR gate for receiving the output signal of the first NAND gate and the output signal of the flip-flop and a second NAND gate for receiving the output of the NOR gate and a control signal applied from the control means;

a second flip-flop for latching said output data of the first multiplexer synchronously with the output signal of the binary counter;

a second multiplexer for selectively outputting the output signals of the second flip-flop and three low-order bits of the output data of the first flip-flop;

a third shift register receiving in parallel eight bits applied from the second shift register, the most significant bit of the output information of the first flip-flop and three bits applied from the second multiplexer, and serially outputting said input data; and a third flip-flop for latching the output signal of the third shift register synchronously with the external clock to be inverted by a inverter.

2. A data compression circuit of a digital audio tape recorder for converting an analog audio signal of sixteen-bit data to twelve-bit data when said recorder is in one of a four-channel operational mode and a long play operational mode, the circuit comprising:

system control means for providing control signals for said circuit, said system control means comprising a timing pulse generator;

converting means for sequentially providing sixteen-bits of digital data corresponding to said analog audio signal;

first shifting means for providing first loaded data in parallel by simultaneously serially loading the sixteen-bits of digital data from the converting means synchronously with a first control signal;

second shifting means for providing second loaded data in parallel after loading said first loaded data in accordance with a second control signal and a shift clock signal;

first latching means for latching eight high-order bits of the first loaded data in accordance with the second control signal;

means for providing an absolute value of the latched eight high-order bits;

comparator means for providing a digital comparator signal after comparing said absolute value with a reference value;

gating means for producing a gating signal corresponding to a most significant bit of the latched eight high-order bits and a most significant bit from the first loaded data;

shift clock producing means for producing the shift clock signal in accordance with a third control signal, a fourth control signal, an inverted fifth control signal and the gating signal;

counter means for producing a counter signal in accordance with a sixth control signal and the fifth control signal;

first multiplexer means for providing first multiplexed data corresponding to the counter signal in accordance with the most significant bit of the latched eight high-order bits;

latching clock generating means for producing a latch clock signal in accordance with seventh, eighth, ninth and tenth control signals and said gating signal;

second latching means for latching said first multiplexed data in accordance with said latch clock signal and an eleventh control signal;

second multiplexer means for providing second multiplexed data corresponding to said first multiplexed data and three low-order bits of said latched eight high-order bits in accordance with the digital comparator signal;

third shifting means for providing third loaded data corresponding to said second multiplexed data and said second loaded data in accordance with the fifth control signal, a twelfth control signal and the most significant bit of the latched eight high-order bits; and third latching means for providing said twelve-bit data by latching the third loaded data in accordance with an inverted said first control signal.

3. A data compression circuit of a digital audio tape recorder for converting an analog audio signal of input data to compressed data when said recorder is in one of four-channel and long play operation mode, the data compression circuit comprising:

a system controller generating control signals for said data compression circuit;

a first data converter providing converted data by sequentially producing digital data from said analog audio signal;

a first shift register providing first shifted data in parallel when simultaneously serially loading the converted data corresponding to a first control signal;

a second shift register providing second shifted data in parallel by loading said first shifted data corresponding to a second control signal and a shift clock signal;

a first flip-flop latching a predetermined number of high-order bits of the first shifted data corresponding to the second control signal;

a second data converter providing an absolute value of the latched predetermined number of high-order bits;

a magnitude comparator providing a comparator signal by comparing the absolute value with a reference value;

a first gate providing a first gate signal in accordance with a most significant bit of the first shifted data and a most significant bit of the latched predetermined number of high-order bits;

a shift clock producer producing the shift clock signal pulse in accordance with a third signal, a fourth control signal, an inverted fifth control signal and the first gate signal;

a binary counter providing count data being one of up-counted data and down-counted data in accordance with a sixth control signal and the fifth control signal;

a first multiplexer for providing first multiplexed data using the count data and the most significant bit of the latched predetermined number of high-order bits;

a latching clock generator producing a latch clock signal in accordance with the first gate signal and seventh, eight, ninth and tenth control signals;

a second flip-flop providing latched multiplexed data by latching the first multiplexed data in accordance with the latch clock signal and an eleventh control signal;

a second multiplexer providing second multiplexed data by receiving the latched multiplexed data, a predetermined number of low-order bits of the latched predetermined number of high-order bits, and the comparator signal;

a third shift register providing third shifted data by using the second multiplexed data, the most significant bit of the latched predetermined number of order bits, the second shifted data, the fifth control signal and twelfth control signal; and a third flip-flop providing said compressed data by latching the third shifted data synchronously with an inverted said first control signal.

4. The data compression circuit of claim 3, wherein the magnitude comparator comprises a plurality of logic gates.

5. The data compression circuit of claim 3, wherein the shift clock producer comprises:

a fourth flip-flop providing a fourth flip-flop signal in response to the first gate signal and the third control signal;

a second gate providing a second gate signal in response to the fourth flip-flop signal and the inverted fifth control signal; and a third gate providing the shift clock signal in response to the second gate signal and the fourth control signal.

6. The data compression circuit of claim 3, wherein the latching clock generator comprises:

a fourth gate providing a fourth gate signal in response to the seventh control signal, the eight control signal and the first gate signal;

a fifth flip-flop providing a fifth flip-flop signal in response to the fourth gate signal, and the ninth control signal;

a fifth gate providing a fifth gate signal in response to the fifth flip-flop signal and the fourth gate signal; and a sixth gate providing the latch clock signal in response to the fifth gate signal and the tenth control signal.

7. The data compression circuit of claim 3, wherein said input data is sixteen-bit data, said compressed data is twelve-bit data, said predetermined number of high-order bits is eight, and said predetermined number of low-order bits is three.

8. A data compression circuit of a digital audio tape recorder for compressing data of a digital audio signal, the circuit comprising:

first flip-flop means for latching eight high-order bits of the data of the digital audio signal;

means for providing an absolute value in dependence relations between a most significant bit of said eight high order bits and upon the latched eight high-order bits, said providing means comprising a plurality of logic gates;

magnitude comparator means for comparing the absolute value with a reference value;

first logic means for receiving a most significant bit of the data of the digital audio signal and said most significant bit of the eight high-order bits;

shift clock producing means for producing a shift clock signal;

binary counter means for providing counted data by counting up and down;

first multiplexer means for selectively outputting the counted data of the binary counter in accordance with said most significant bit of the eight high order bits;

latching clock generator means for producing a latching clock signal;

a second flip-flop for latching said output data of the first multiplexer synchronously with the latching clock signal;

a second multiplexer for selectively outputting the latched data of the second flip-flop and three low-order bits of the eight high order bits; and a shift register receiving in parallel and serially outputting eight low-order bits of the data of the digital audio signal, the most significant bit of the eight high-order bits and said selective output from the second multiplexer.

9. A data compression circuit of a digital audio tape recorder for converting first data of an audio signal into compressed data, the circuit comprising:

absolute value producing means for providing an absolute value of a high-order part of the first data, and for determining whether said first data is one of positive data and negative data;

comparing means for comparing the high-order part of the first data received from the absolute value producing means with a predetermined reference value of the digital audio tape recorder, generating a comparator signal exhibiting a first logic state when said high-order part differs from said reference value, said first logic state comparator signal corresponding to shifting of preassigned bits of the high-order part of the first data, and generating the comparator signal exhibiting a second logic state when the high-order part of the first data equals said reference value, said second logic state comparator signal corresponding to non-shifting of the preassigned bits;

weight detecting means for generating a weight detecting signal corresponding to a number of clock pulses, each of said clock pulses corresponding to said shifting by one bit of said preassigned bits of the high-order part of the first data by detecting a highest order bit of the first data excluding the most significant bit which differs from the most significant bit;

counting means for generating a value of the preassigned bits of the high-order part corresponding to the weight detecting signal by counting down by said number of clock pulses when said first data is positive, and for generating the value of the preassigned bits of the high-order part corresponding to the weight detecting signal by counting up by said number of clock pulses when said first data is negative; and output means for outputting, in response to the comparator signal, said compressed data comprising a predetermined low-order part of said first data, said preassigned bits of the high-order part of said first data when the comparator signal exhibits said second logic state and said preassigned bits from the counting means when the comparator signal exhibits said second logic state, and said most significant bit of the first data.

10. A method of compressing first data of an audio signal for a digital audio tape recorder comprising the steps of:

determining an absolute value of a high-order part of the first data;

determining whether said first data is one of positive data and negative data;

comparing the high-order part of the first data with a predetermined reference value of the digital audio tape recorder;

generating a comparator signal as a high logic state when said high-order part differs from said reference value, said high logic state comparator signal corresponding to shifting of preassigned bits of the high-order part of the first data;

generating the comparator signal as a low logic state when the high-order part of the first data equals said reference value, said low logic state comparator signal corresponding to non-shifting of the preassigned bits;

generating a weight detecting signal corresponding to a number of clock pulses, each of said clock pulses corresponding to said shifting by one bit of said preassigned bits of the high-order part of the first data, by detecting a highest order bit which differs from the most significant bit;

generating a value of the preassigned bits of the high-order part corresponding to the weight detecting signal by counting down by said number of clock pulses when said first data is positive; generating the value of the preassigned bits of the high-order part corresponding to the weight detecting signal by counting up by said number of clock pulses when said first data is negative; and outputting, in response to the comparator signal, said compressed data comprising a predetermined low-order part of said first data, said preassigned bits of the high-order part of said first data when the comparator signal is low, said preassigned bits from the counting means when the comparator signal is high, and said most significant bit of the first data.

11. A data compression circuit of a digital audio tape recorder for compressing sixteen bit data of an audio signal into twelve bit data, the circuit comprising:

absolute value producing means for providing means for providing an absolute value of eight high-order bits of the sixteen bit data, and for determining whether said sixteen bit data is one of positive data and negative data;

comparing means for comparing the eight high-order bits of the sixteen bit data received from the absolute value producing means with a predetermined reference value of the digital audio tape recorder, generating a comparator signal with a first logic state when said eight high-order bits differ from said reference value, said first logic state comparator signal corresponding to shifting of three low-order bits of the eight-order bits, and generating the comparator signal with a second logic state when the eight-order bits equal said reference value, said second logic state comparator signal corresponding to non-shifting of the three low-order bits;

weight detecting means for generating a weight detecting signal corresponding to a number of clock pulses, each of said clock pulses corresponding to said shifting by one bit of said three low-order bits, by detecting a highest order bit excluding the most significant bit of the sixteen bit data which differs from the most significant bit;

counting means for generating a value of the three low-order bits corresponding to the weight detecting signal by counting down by said number of clock pulses when said sixteen bit data is positive, and for generating the value of the three low-order bits corresponding to the weight detecting signal by counting up by said number of clock pulses when said first data is negative; and output means for outputting, in response to the comparator signal, said compressed data comprising eight low-order bits of the sixteen bits, said three low-order bits of the sixteen bits when the comparator signal exhibits said second logic state and said three low-order bits from the counting means when the comparator signal exhibits said first logic state, and said most significant bit of the sixteen bit data.

12. A method of compressing sixteen bit data of an audio signal into twelve bit data for a digital audio tape recorder comprising the steps of:

determining an absolute value of eight high-order bits of the sixteen bit data;

determining whether said sixteen bit data is one of positive data and negative data;

comparing the eight high-order bits with a predetermined reference value of the digital audio tape recorder;

generating a comparator signal exhibiting a first logic state when said eight high-order bits differ from said reference value, said first logic state comparator signal corresponding to shifting of three low-order bits of the eight high order bits;

generating the comparator signal exhibiting a second logic state when the eight high-order bits equal said reference value, said second logic state comparator signal corresponding to non-shifting of the three low-order bits;

generating a weight detecting signal corresponding to a number of clock pulses, each of said clock pulses corresponding to said shifting by one bit of said three low-order bits, by detecting a highest order bit excluding the most significant bit of the sixteen bit data which differs from the most significant bit;

generating a value of the three low-order bits of the eight high-order bits corresponding to the weight detecting signal by counting down by said number of clock pulses when said sixteen bit data is positive;

generating the value of the three low-order bits of the eight high-order bits corresponding to the weight detecting signal by counting up by said number of clock pulses when said sixteen bit data is negative; and outputting, in response to the comparator signal, said compressed data comprising eight low-order bits of said sixteen bit data, said three low-order bits of the eight high-order bits when the comparator signal exhibits said second logic state and said three low-order bits from the counting means when the comparator signal exhibits said first logic state, and said most significant bit of the sixteen bit data.

* * * * *

UNITED STATES PATENT AND TRADEMARK OFFICE
CERTIFICATE OF CORRECTION

PATENT NO. : 5,197,101
DATED : 23 March 1993  Page 1 of 2
INVENTOR(S) : Cheolwoong Mok It is certified that error appears in the above-indentified patent and that said Letters Patent is hereby corrected as shown below:

Column 1,

Line 20,    replace "digital" with --digital audio tape recorder--;

Line 22,    change "768K bit/sec" to --768 Kbit/sec--;

Lines 22-23,    change "768K bit/sec" to --768 Kbit/sec--;

Line 27,    change "768K bit/sec" to --768 Kbit/sec--;

Column 3,

Line 57,    after "i.e. a", insert --non-shift field--;

Column 5,

Line 62,    before "at relatively close", insert --or--;

UNITED STATES PATENT AND TRADEMARK OFFICE
CERTIFICATE OF CORRECTION

PATENT NO. : 5,197,101
DATED : 23 March 1993
INVENTOR(S) : Cheolwoong Mok

It is certified that error appears in the above-indentified patent and that said Letters Patent is hereby corrected as shown below:

IN THE CLAIMS

Column 7,

Line 5,    change "comprising" to --comparing--;

Signed and Sealed this

Sixteenth Day of August, 1994

Attest:

BRUCE LEHMAN

*Attesting Officer*    *Commissioner of Patents and Trademarks*